Aug. 30, 1932. G. C. TROTTER 1,874,657
SELF LOCKING SCREW DEVICE
Filed Oct. 24, 1930
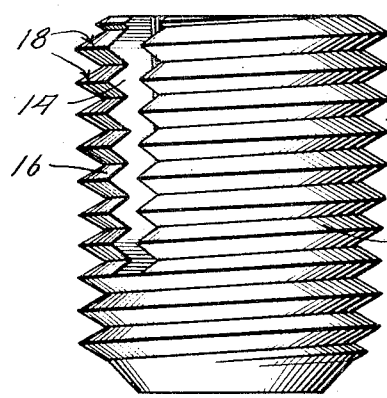
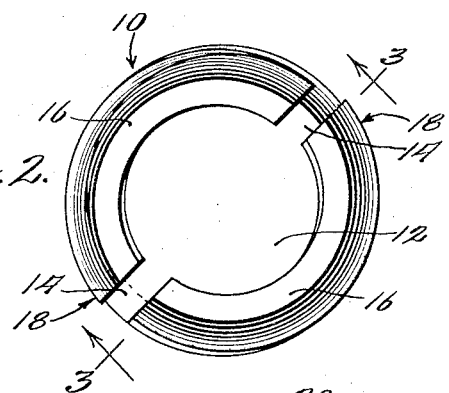
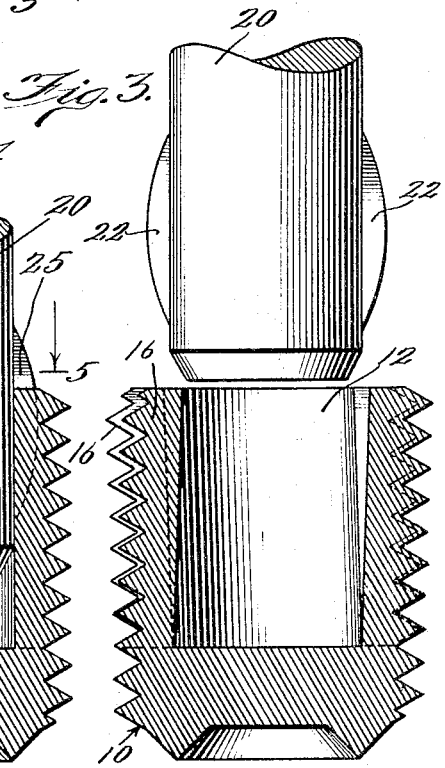
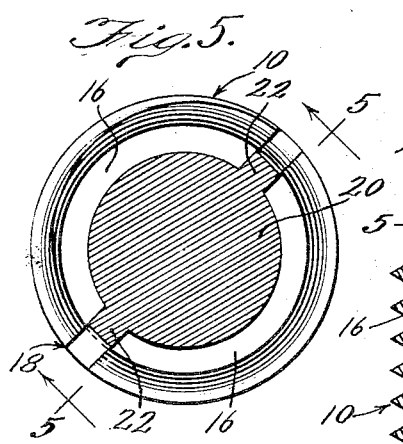
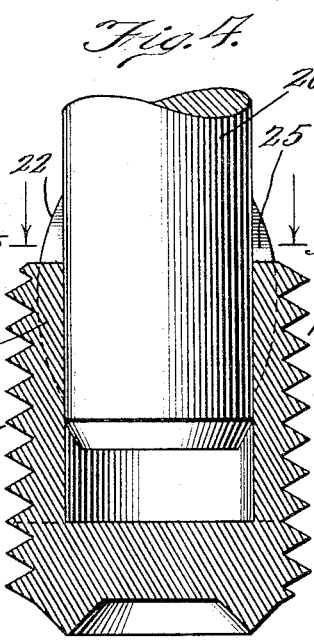
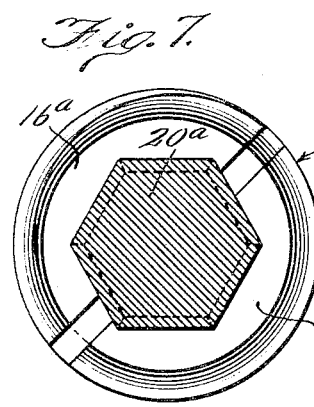
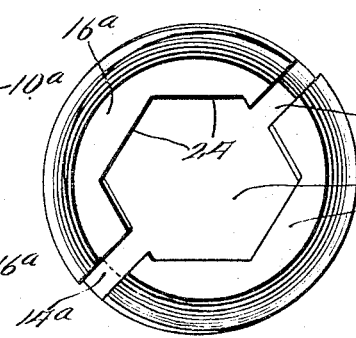
Inventor:
George C. Trotter
By Cleever, Cox & Moore
atty.

Patented Aug. 30, 1932

1,874,657

UNITED STATES PATENT OFFICE

GEORGE C. TROTTER, OF CHICAGO, ILLINOIS, ASSIGNOR TO SHAKEPROOF LOCK WASHER COMPANY, OF CHICAGO, ILLINOIS, A CORPORATION OF DELAWARE

SELF-LOCKING SCREW DEVICE

Application filed October 24, 1930. Serial No. 490,954.

My invention relates generally to self-locking screw devices, and more particularly to means in combination therewith for facilitating the attachment or removal of such screws with respect to a work piece.

It has been the practice heretofore in certain instances to employ screws, such as set screws, which are recessed or configurated in such a manner that, when they are applied to the work piece, they will become automatically locked or secured against loosening. One form of screw of this design is provided with a recess extending transversely of the screw so as to enable a section of the screw threads to be normally displaced laterally of the screw axis. By having this section of the screw thread normally displaced or offset laterally with respect to the screw axis, or, in other words, out of the normal alinement of the screw threads, said threaded section is adapted, when the screw is tightened within the work piece, to constantly and resiliently bear against the complementary threads in the work piece so as to secure the screw against inadvertent loosening. My present invention contemplates the provision of means whereby screws of the above mentioned nature may be more conveniently associated with or removed from the work piece, and to this end I propose to provide a tool or drift which may be inserted within the recess of the screw, and in this manner effect the alteration of the normal position of the offset threaded section. In other words, I propose to temporarily effect a re-alinement of the screw threads by means of this drift so as to facilitate the screwing or unscrewing of the device within the work piece.

More specifically, it might be stated that my invention contemplates the provision, in combination with a screw or set screw of the type set forth above, of means insertable within the recess of the screw and having a surface adapted to co-act with the wall of the recess so as to automatically effect the altering of the normally deflected or offset threaded section of the screw as and for the purpose set forth above.

Still more specifically, my invention contemplates the provision of means for altering the normal position of the above mentioned threaded section of the screw, which, in addition to effecting the re-alinement of the screw threads, will also serve as a wrench to enable the screw to be conveniently tightened or loosened.

The foregoing and numerous other objects and advantages will be more apparent from the following detailed description when considered in connection with the accompanying drawing, wherein—

Figure 1 is a side elevational view of a set screw, which is representative of one type of device capable of being altered and rotated by my improved drift or wrench;

Figure 2 is a plan view of the device of Figure 1, disclosing the manner in which the threaded sections of the set screw are normally offset laterally to effect the self-locking thereof when applied to the work piece;

Figure 3 is a transverse sectional view taken substantially along the line 3—3 of Figure 2, a wrench or drift of my improved construction being disclosed immediately above the screw in position to be applied thereto;

Figure 4 is a view similar to Figure 3, disclosing the drift inserted within the set screw;

Figure 5 is a horizontal sectional view taken substantially along the line 5—5 of Figure 4;

Figure 6 is a plan view of a set screw having a modified recess of hexagonal cross section; and Figure 7 is a plan view similar to Figure 6, disclosing a tapered multi-sided drift inserted within the screw so as to effect the desired alteration of the threaded sections.

Referring now to the drawing more in detail, wherein like numerals have been employed to designate similar parts throughout the various figures, it will be observed that for the purpose of illustrating one practical application of my invention, I have disclosed the same in association with a set screw designated generally by the numeral 10, Figures 1 to 5 inclusive. This set screw 10 is formed with a central cylindrical recess or opening 12 and communicating radial recesses 14. These recesses 12 and 14 divide the threaded portion of the screw 10 into two similar sections or units 16, as clearly shown in Figures 2 and 5. These threaded sections 16 are slightly displaced or offset laterally with respect to the axis of the screw so as to present edges 18 of the threads which project beyond the normal cylindrical plane of the screw, as clearly shown in Fgure 2. Thus, when the screw 10 is applied to the threaded aperture of a work piece, the thread edges 18 serve to resiliently bear against complementary surfaces of the threads in the work piece and counteract any tendency to rotate the screw in a counterclockwise directon, as viewed in Figure 2.

My present invention does not relate to the screw structure per se, but does relate to the combination of such a screw structure with means for facilitating the application and removal of the screw with respect to the work piece. In this connection specific reference is made to the drift or wrench 20 disclosed in Figures 3 to 5 inclusive. This drift 20 is cylindrically formed and is provided with oppositely disposed projections or keys 22 which are adapted to be received by the radial recesses or slots 14. The lower extremity of the drift 20 is tapered so as to facilitate the insertion thereof within the cylindrical recess 12 of the screw. In other words, the taper at the lower end of the drift serves to guide it into said recess. The diameter of the drift 20 is such that, when it is inserted within the central or axial recess 12 of the screw, the threaded sections 16 will be altered from the normal offset position shown in Figure 2 and shifted to the position shown in Figure 5.

From the foregoing it will be apparent that the drift 20 serves to alter the normal deflected position of the threaded section 16 so as to effect a substantial re-alinement of the threads, thereby enabling the screw to be applied to the work piece without the necessity of overcoming the resistance which would otherwise be set up as a result of the engagement of the thread edges 18 with the complementary portions of the threads in the work piece. After the screw has been completely seated within the work piece, the drift or wrench 20 may be withdrawn by merely exerting a pull axially thereof so as to withdraw the keys 22 from the recesses 14 and the adjacent cylindrical section of the drift from the longitudinal or central recess 12. When the drift has been disassociated from the screw in this manner, the threaded sections 16 are again urged toward their normal deflected or offset position so as to resiliently bear against the threads of the work piece, and in this manner firmly secure the screw against inadvertent loosening. When it is desired to remove the screw from the work piece, it is only necessary to insert the drift within the recesses of the screw, as described above, thereby automatically bringing the screw threads into axial alinement. By imparting rotation to the drift in the proper direction, the set screw may be very conveniently withdrawn from the work piece.

In Figures 6 and 7 I have disclosed a modified set screw which I have designated generally by the numeral 10a. This screw 10a is provided with transverse or radial recesses 14a which correspond to the recesses 14 of the screw 10, and a central longitudinal recess 12a which corresponds to the recess 12 of the screw 10. This recess 12a is bounded by a plurality of wall surfaces 24 as distinguished from the recess 12, which is bounded by a substantially cylindrical wall surface. Threaded sections 16a of the screw 10a are offset with respect to the axis of the screw in the manner described in connection with the screw 10 so as to effect the automatic locking or self-locking thereof when the screw is applied to the threaded opening of a work piece. In order to effect the altering of the normal deflected positions of the sections 16a, I employ a multi-sided tapered drift or wrench 20a, which is adapted to be inserted within the central recess 12a. The tapered arrangement of the drift 20a serves to expedite the insertion of the device within the screw, and the plurality of sides serve to prevent relative rotation between the drift and the screw. Thus the drift 20a serves not only as a means for effecting the re-alinement or alteration of the threaded sections 16a, but also provides means for effecting the rotation of the screw.

In the drawing I have disclosed the set screws 10 and 10a with central longitudinal recesses which extend only partially through the screw stock. However, my invention also contemplates the use of set screws, in combination with drifts or wrenches therefor, which are provided with central apertures extending completely through the same. This construction is particularly desirable when a central cylindrical recess is employed, because in such instances the recesses may be conveniently drilled within the screw stock.

From the foregoing it will be apparent that my invention contemplates the provision of simple and conveniently operable means, whereby screws of the self-locking type may be very expeditiously applied to and disassociated from threaded apertures and the like. Obviously my invention is not limited for use in connection with the particular type of screws shown in the drawing, nor is it limited to the specific type of drifts or wrenches shown in said drawing, but is capable of other structural modifications and changes without departing from the spirit and scope of said invention.

Having thus described my invention, what I claim as new and desire to secure by Letters Patent is:

1. A screw having a threaded section normally displaced laterally with respect to the screw axis to render the same self-locking, and a recess adapted to receive a drift for altering the normal position of said threaded section to facilitate the turning of the screw within a work piece.

2. A screw having a threaded section normally displaced laterally with respect to the screw axis to render the same self-locking, and provided with a recess having a wall adapted to be engaged by a member inserted within said recess to alter the normal position of said threaded section and thereby facilitate the turning of the screw within a work piece.

3. A screw having a threaded section normally displaced laterally with respect to the screw axis to render the same self-locking and having an axial recess adapted to receive a tool for effecting the displacement of said threaded section from its normal position.

4. A screw having a threaded section normally displaced laterally with respect to the screw axis to render the same self-locking and having a multi-sided recess for receiving a multi-sided drift to enable the displacement of said threaded section from its normal position.

5. A screw of the class described including a screw body having a central recess extending axially thereof, the portion of the screw surrounding said recess being divided into at least two screw sections, one of said sections being deflected laterally with respect to the screw axis in a given direction and the other section being deflected laterally of the screw axis in the opposite direction, whereby to present wall portions surrounding said central recess inclined in opposite directions with respect to the screw axis so as to enable the engagement of said oppositely inclined walls by a tool inserted within said central recess for effecting the re-alinement of said sections and thereby faciliate the turning of the screw within a work piece.

In witness whereof, I have hereunto subscribed my name.

GEORGE C. TROTTER.